April 12, 1966  D. R. ADAMS ETAL  3,246,112
POLYPROPYLENE DIAPHRAGM ASSEMBLIES
Filed April 6, 1964  2 Sheets-Sheet 1

DONALD R. ADAMS
THEODORE H. SCHORR
INVENTORS.

BY
AGENT

DONALD R. ADAMS
THEODORE H. SCHORR
INVENTORS.

AGENT

United States Patent Office 3,246,112
Patented Apr. 12, 1966

3,246,112
POLYPROPYLENE DIAPHRAGM ASSEMBLIES
Donald R. Adams, Los Angeles, Calif. (P.O. Box 865, Felton, Calif. 95018), and Theodore H. Schorr, Los Angeles, Calif. (14530 Armenta St., Van Nuys, Calif. 91402)
Filed Apr. 6, 1964, Ser. No. 357,497
4 Claims. (Cl. 200—168)

This invention relates to diaphragms assemblies, of the type usable in a variety of devices such as switches of the push-button type, diaphragms in pneumatic control apparatus, and the like.

In a number of applications, it is desirable to have a diaphragm which is actuatable by pressure between one position, generally recognizable as an outward, and an inward position. Such devices are usable particularly in electric switches, wherein the diaphragm is moveable between the two positions mentioned by pressure, as for example the force supplied by a finger as in a push button switch, the force supplied by air pressure as in a pneumatically operated switch, or the force supplied as in a liquid pressure operated switch. In many devices of the general type alluded to, it is necessary to provide separately for some sort of movable disk or the like to receive the actuating pressure, for a spring or other like means to restore the device to its original position, and, where sealing is important or necessary, for some kind of hermetic or other seal. Quite frequently these functions are fulfilled by separate elements, and devices embodying all of the features mentioned can become complicated, cumbersome, and difficult of repair and replacement for that reason. Often in addition it is necessary to provide for electrical insulation between the inside and the outside of the device, and moreover it is often necessary to provide some degree of resistance to weathering or other deterioration by the ambient environment, and these generally introduce further design and construction complications by restricting the choice of materials and the like.

It is an object of the present invention to provide a self-restoring pressure actuatable diaphragm providing electrical insulation and capable of use in switches and like apparatus, and further capable of possessing a selectively variable time delay for self-restoration. Further objects of the invention will appear as the description thereof proceeds.

In the drawings:

FIGURES 8, 9, 10, 11, 12, 13 and 14 are fragmentary cross sections showing alternative embodiments of our device, while

Generally speaking, and in accordance with illustrative embodiments of our invention, we provide an essentially circular disk of a material having the properties of polypropylene and secure it to a mounting rim of a solid substance by means of an annular membrane integral with the disk and formed of the same body of material therewith, the mounting rim being of slightly larger diameter than the diameter of the circular disk proper, so as to leave sufficient space for the annular membrane. The annular membrane will be in all cases of lesser thickness than the body of the disk proper, and when the disk is depressed, a flexing action takes place in the annular membrane.

Figure 1:
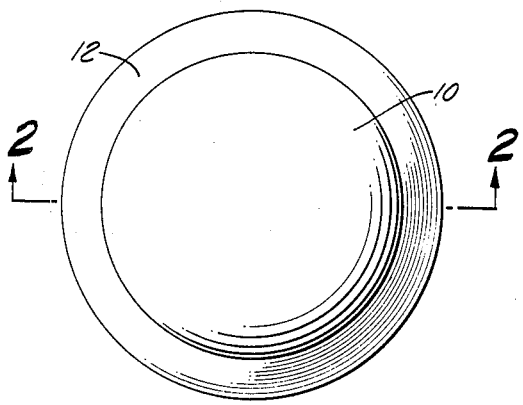
FIGURE 1 is a top view of an illustrative embodiment of our invention.

The working of the invention may be more readily understood by reference to the figures. Considering first the device shown in FIGURES 1, 2 and 3; therein, 10 is a circular disk of polypropylene, 11 is a mounting rim bearing a mounting flange 12, all of which in this embodiment are made from a single piece of polypropylene. 13 is an annular membrane which joins disk 10 to the top of mounting rim 11, which as already noted, is integral with the remainder of the device.

Figure 2:
FIGURE 2 is a sectional side view taken through a diameter of the device shown in FIGURE 1.
Figure 3:
FIGURE 3 is a sectional view similar to that of FIGURE 2, but showing the device in its depressed, or inverted state.

If pressure is applied downwardly to circular disk 10, it inverts, from a convex shape (as viewed from above) to a concave shape, as may be seen from FIGURE 3. In so doing, it will be apparent that annular membrane 13 undergoes a sharp bending and flexing of its own. In the usual disposition of the device of FIGURES 1, 2 and 3, if the pressure causing the deformation shown in FIGURE 3 is released, then the device will snap back into the starting configuration shown in FIGURE 2.

Now a device such as has been described, if made of any of the plastics not recited in the claims hereof, such as for example nylon, polystyrene, polycarbonate plastics such as Lexan, polytetrafluoroethylene plastics such as Teflon and Kel-F, ethyl cellulose, cellulose acetate, and the like, will in general undergo the inversion shown in FIGURE 3, but the cycle can not be repeated very many times without failure where the disk joins the rim, even though a relatively thin annular membrane is provided. Polypropylene, together with the polyethylene modified polypropylene known as "polyallomer," is completely unique in that the annular membrane 13 of our inventive device shows no fatigue even after hundreds of thousands of cycles. (Polyallomer is substantially polypropylene except that it is made up of a proportion of ethylene which is minor compared to the propylene used, so that for all practical purposes it behaves like polypropylene and thus has the properties of polypropylene. It has been described in a paper given at the International Macromolecular Symposium in Paris in July 1963 by Hagemeyer and Edwards, and appearing in the Journal of Polymer Science.)

The properties of polypropylene which contribute to the result just described are a remarkable combination of high crystallinity, which provides high strength in thin membranes, especially after orientation has taken place as a result of flexing; high elongation; and high tensile strength. It may be remarked that it is most unusual to find high tensile strength and high elongation in the same material.

Figure 4:
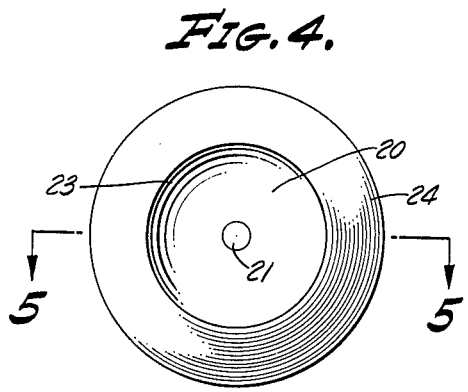
FIGURE 4 is a bottom view of another embodiment of our invention.
Figure 5:
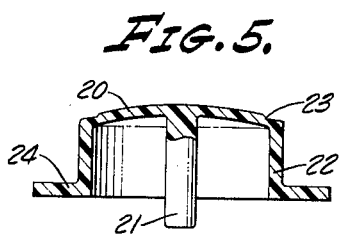
FIGURE 5 is a sectional side view taken through a diameter of the device shown in FIGURE 4.

Considering now the alternative embodiment shown in FIGURES 4 and 5, the device pictured therein consists of a single piece of polypropylene constructed so as to have a dome-shaped diaphragm or circular disk 20, which bears an extension on its inner side in the form of a push rod 21, located axially with respect to the device as a whole. The central disk 20 is joined to a mounting rim 22 by means of an annular membrane 23; the device is made adaptable to use in a variety of mechanisms by a mounting flange 24. If pressure is applied more or less centrally to the top of the dome-shaped circular disk 20, then the push rod 21 is pushed downward, flexing taking place in the annular membrane 23. When the pressure is released, the device restores itself to the configuration shown in FIGURE 5.

We have found that when the dome-shaped diaphragm is made of a relatively uniform thickness throughout, then the inversion, and "turning inside out" is relatively complete, and there is a time factor involved for re-inversion, or "snapping" back to the original shape. If the diaphragm is made progressively thinner, and particularly if it is non-uniform in thickness so that it has a relatively thick section in the center, as for example is the case in the device shown in FIGURES 4 and 5, then the inversion produced by pressure is not complete, the diaphragm does not "turn inside out" completely but only partially, and the return tends to be more or less instantaneous. By adjusting the thickness and the distribution of thickness between the two extremes mentioned and exemplified for example by FIGURES 2 and 5 respectively, the time for restoration may be varied from practically instantaneous to several seconds, and this property is of especial value in momentary-hold switching applications and the like.

Figure 6:
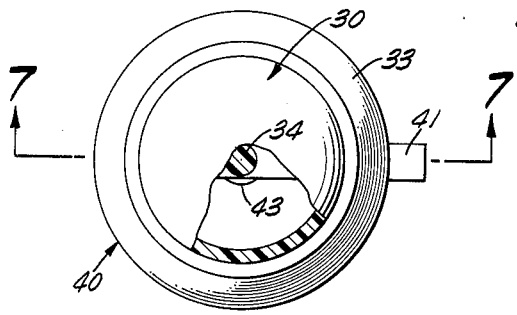
FIGURE 6 is a top view, partly fragmentary, showing an electrical switch embodying the inventive device.
Figure 7:
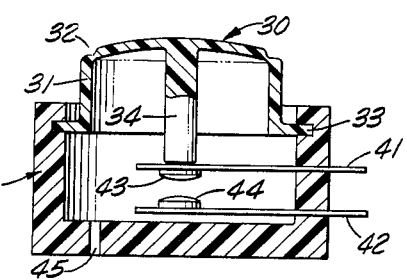
FIGURE 7 is a sectional view taken as indicated by the arrows in FIGURE 6.

As mentioned, our diaphragm assemblies are especially adaptable for use in switches. An illustrative switch construction embodying our inventive diaphragm assembly is shown in FIGURES 6 and 7. Here, the polypropylene structure 30 is essentially similar to the device shown in FIGURES 4 and 5, and includes a dome-shaped circular disk joined to a mounting rim 31 by means of an annular membrane 32, the lower part of the mounting rim being joined to a flange 33. A push rod 34 is integral with the diaphragm assembly. The latter is sealed in an essentially cup-shaped housing 40 which may be made of a suitable plastic, preferably quite rigid, such as phenol formaldehyde, mica-filled melamine-formaldehyde, and the like. Molded in the housing 40 are two switch contact leads 41 and 42 in the form of leaf springs, of a suitable material such as beryllium copper. These spring leads 41 and 42 bear contact points 43 and 44, which may be made of platinum or other contact metal common in the electrical switch art. When the diaphragm assembly 30 is pushed downward, push rod 34 closes the contact between points 43 and 44. A small air vent 45 may be provided.

The device shown in FIGURES 6 and 7 is also very well adapted to use as an electro-pneumatic or electro-hydraulic pressure switch, by merely closing off the vent 45 and immersing it in a body of gas or liquid, as the case may be. In this use, the increase in gas pressure or liquid pressure forces push rod 34 down as previously described and closes the switch contacts.

In general, we construct our diaphragm assemblies so that the thickness of the integral annular membrane is less than the thickness of the body of the circular disk, and moreover is between 2 and 30 mils in thickness, about 12 to 15 mils being optimum. (A mil is one thousandth of an inch.) As a practical matter, we have found that a good "rule of thumb" is to have the said thickness of the body of the circular disk at least one and one-half times the thickness of the annular membrane; and a considerably greater thickness may often be usefully employed, as has been discussed. It will be observed that this is the case for all of the embodiments shown in the drawings. In so proceeding, peripheral flexing is caused to take place in the annular membrane, and the remarkable, peculiar and unique properties of polypropylene alluded to hereinabove cause the so-flexed annular membrane to adapt itself, after two or three such flexings, to indefinite flexing without failure in this membrane. Otherwise stated, the annular membrane localizes the flexing, regardless of how much additional inversion there may be in the circular disk proper.

In connection with the thickness limits given hereinabove for the annular membrane, it has been found that it is impractical to use a thickness less than 2 mils, the annular membrane becoming rather fragile, and in any case having a relatively short life. On the other hand, a thickness of greater than about 30 mils deprives the annular membrane of sufficient flexibility for practical usefulness in the inventive device. The optimum range of 12 to 15 mils have been found to work best, and is the best compromise that the inventors have found between the extremes of fragility and inflexibility.

Figure 8:
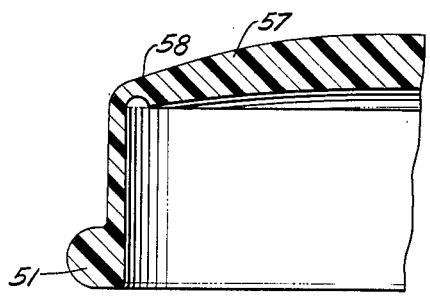
Figure 9:
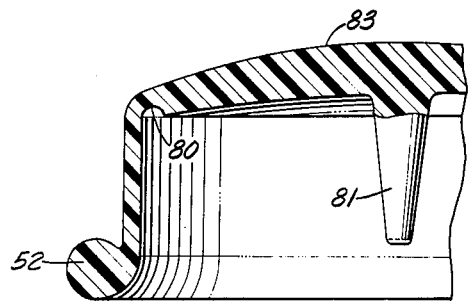
Figure 10:
Figure 11:
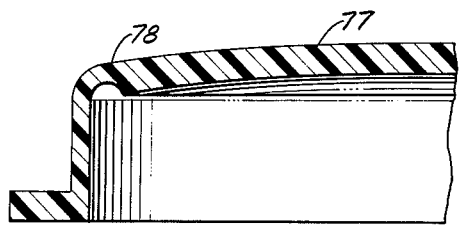
Figure 12:
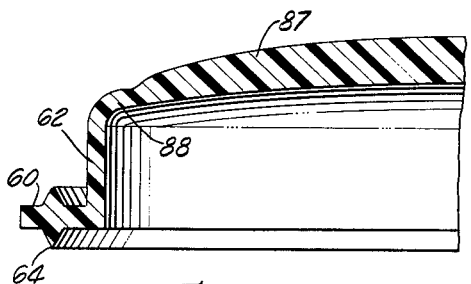
Figure 13:
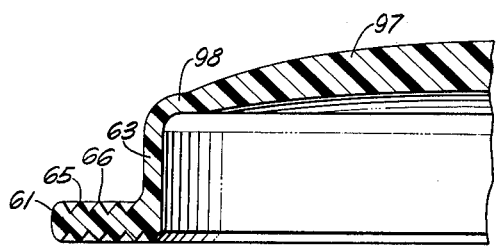
Figure 14:
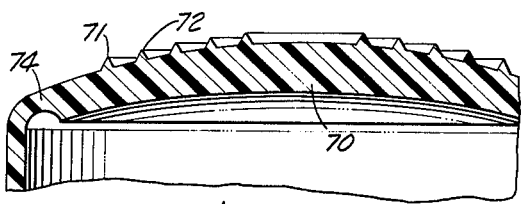
Figure 15:
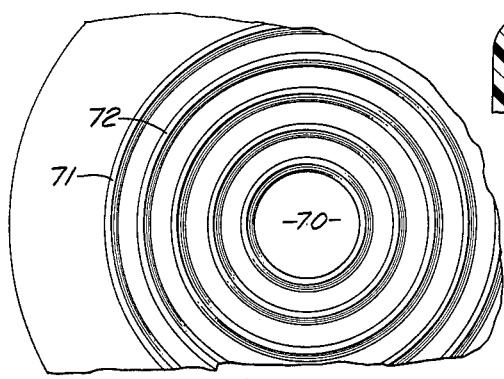
FIGURE 15 is a fragmentary top view of the device of FIGURE 14.

In FIGURES 8, 9, 10, 11, 12, 13 and 14 we show fragmentary cross sections after the general pattern of FIGURE 2, but showing variations within the scope of the invention in the exact disposition of the annular membrane as well as in the mounting rim. Thus, in FIGURES 8, 9, 11 and 14, material may be considered as having been removed from the underside in order to create the integral annular membrane, which is in contrast, for example, to the embodiment shown in FIGURE 2. In FIGURE 10, it may be considered that material has been removed from both sides in order to achieve the same end. In FIGURE 10, the mounting rim 50 is essentially flat instead of cylindrical as in FIGURES 2 and 8, for example. In the devices of FIGURES 8 and 9, the lower portion of the mounting rim terminates in a bead, 51 and 52 respectively, which may be used to facilitate a seal. In the devices of FIGURES 12 and 13, the flange 60 and 61 on the mounting rim 62 and 63, respectively, has been provided with one or more circular, sharp corrugations 64, 65, 66 which are of assistance in obtaining a seal, particularly when gaskets are used on both sides of the flange. In the device shown in FIGURES 14 and 15, the circular disk 70 has been reinforced on its top side with a series of circular corrugations 71, 72. The device of FIGURE 9 shows a variation over the device of FIGURE 5, in which, as already noted, the position of the annular membrane 80 has been changed slightly, and in which the actuating rod 81 bears a slight taper.

In the embodiment shown in FIGURES 8, 10, 11, 12 and 13, the circular disk is indicated by reference numerals 57, 67, 77, 87, and 97 respectively; while the annular membrane is designated by reference numerals 58, 68, 78, 88 and 98 respectively. In FIGURE 9, the circular disk is designated by the reference numeral 83; and in FIGURE 14, the annular membrane is designated by reference numeral 74.

By the term "circular" we of course mean to include slight departures from an absolute, mathematically perfect circle. Thus, for example, an ellipse having major and minor axis differing by only ten percent, or a circular polygon of twenty-four sides, will both be substantially indistinguishable from a circle in appearance, and will behave in the same fashion within the purview of this invention.

We have described our invention with the aid of numerous specific embodiments, but it will be apparent that our invention is a broad one, and numerous variations in detail may be made within the spirit of the invention, as defined by the claims which follow.

Having described our invention, we claim:

1. A pressure actuatable diaphragm assembly moveable between an outward position and an inward position comprising an essentially circular disk of a material having the properties of polypropylene; a mounting rim of a solid substance, the inner diameter of said rim slightly exceeding the outer diameter of said disk; and an annular membrane integral with said disk and formed of the same body of material therewith, said annular membrane connecting said disk with said rim, and said annular membrane having a thickness of between about 2 and about 30 mils.

2. The diaphragm assembly in accordance with claim 1 wherein said disk is dish-shaped and invertable from a convexo-concave aspect to a concavo-convex aspect.

3. The diaphragm assembly in accordance with claim 1 wherein the thickness of said circular disk is at least one and one-half times the thickness of said annular membrane.

4. The diaphragm assembly in accordance with claim 1 wherein said mounting rim is formed of the same body of material as said disk and said membrane.

References Cited by the Examiner

UNITED STATES PATENTS 3,049,603 8/1962 Flatt et al. _____ 200—168 X
3,185,806 5/1965 Bowman et al. _____ 200—168

KATHLEEN H. CLAFFY, *Primary Examiner.*

H. O. JONES, *Assistant Examiner.*